United States Patent [19]
Faust

[11] Patent Number: 5,677,386
[45] Date of Patent: Oct. 14, 1997

[54] CAPPING OF LIVING POLYMERS

[75] Inventor: Rudolf Faust, Lexington, Mass.

[73] Assignee: University of Massachusetts Lowell, Lowell, Mass.

[21] Appl. No.: 410,525

[22] Filed: Mar. 24, 1995

Related U.S. Application Data

[63] Continuation of Ser. No. 137,684, Oct. 15, 1993, abandoned.

[51] Int. Cl.$^6$ .............................. C08F 8/00; C08F 110/10
[52] U.S. Cl. ................ 525/289; 525/242; 525/270; 525/312; 525/918; 526/348.7
[58] Field of Search ........................ 525/242, 289, 525/312, 270, 292, 245; 526/348.7

[56] References Cited

U.S. PATENT DOCUMENTS

| | | | |
|---|---|---|---|
| 3,565,878 | 2/1971 | Kennedy | 525/292 X |
| 3,970,534 | 7/1976 | Fujiwara et al. | 525/289 X |
| 4,276,394 | 6/1981 | Kennedy et al. | 525/245 |
| 4,442,261 | 4/1984 | Kennedy et al. | 525/312 X |
| 4,946,899 | 8/1990 | Kennedy et al. | 525/244 |
| 4,956,485 | 9/1990 | Leitz et al. | 556/446 |
| 5,077,346 | 12/1991 | Dias et al. | 528/383 |
| 5,081,251 | 1/1992 | Bender et al. | 546/350 |
| 5,153,291 | 10/1992 | Leitz et al. | 526/279 |
| 5,260,378 | 11/1993 | Gardini et al. | 525/918 X |
| 5,321,093 | 6/1994 | Bronstert et al. | 525/314 |
| 5,428,111 | 6/1995 | Faust et al. | 525/245 X |

FOREIGN PATENT DOCUMENTS

| | | |
|---|---|---|
| 0 002 012 | 5/1979 | European Pat. Off. . |
| 0 374 553 | 12/1989 | European Pat. Off. . |
| 0 442 068 | 12/1990 | European Pat. Off. . |
| 149708 | 7/1987 | Japan . |
| 4154815 | 5/1992 | Japan ................... 525/312 |
| 91/04993 | 4/1991 | WIPO . |

OTHER PUBLICATIONS

Quirk, Roderic P. and Ren, Jie, "Synthetic Applications of Non–Polymerizable Monomers in Living Anionic and Group Transfer Polymerization," *Macromolecules*, pp. 133–148 (1992).

Turner Alfrey, Jr., et al., "Copolymerization," (Inter–Science, 1952), 45–50.

Mathieson, Styrene, "The Chemistry of Cationic Polymerization," Pergamon Press, 237, 240 (1963).

*Primary Examiner*—Fred Teskin
*Attorney, Agent, or Firm*—Hamilton, Brook, Smith & Reynolds, P.C.

[57] ABSTRACT

The present invention provides a process for the capping of a living polymer with a substituted or unsubstituted diphenyl alkylene. Diphenyl alkylene is defined to also include substituted or unsubstituted α-methoxystyrene, trans-stilbene, 1-isopropenylnapthalene and 2,4-dimethyl-α-methylstyrene.

7 Claims, No Drawings

CAPPING OF LIVING POLYMERS

RELATED APPLICATION

This is a Continuation of U.S. Ser. No. 08/137,684, filed Oct. 15, 1993, now abandoned, the entire teachings of which are incorporated herein by reference.

FILED OF THE INVENTION

The present invention provides a process for the capping of a living polyolefin chain end, preferably a functionalized polyisobutylene chain end. This provides, among other things, an efficient method for the preparation of copolymers and block copolymers based on polyisoolefins and styrenic monomers.

BACKGROUND OF THE INVENTION

Living polymerizations i.e., polymerizations that proceed in the absence of termination and chain transfer are a most desirable objective of the synthetic polymer chemist.

The living polymerization of olefins is a method utilized to control molecular weight and final product properties in polymers. The polymerizations are called living because the initiators grow only one chain per initiator molecule and the polymerization continues until monomer is exhausted rather than terminating when the chain reaches a certain length or the catalyst is exhausted. Living polymerizations yield polymers with well defined structure, controlled molecular weight, molecular weight distribution and chain end functionalities.

While considerable accomplishments have been made in living carbocationic polymerizations to achieve molecular weight, molecular weight distribution control and advances have been made in the synthesis of block copolymers by sequential monomer addition, success remains limited in the field of preparing functionalized polymers by in situ functionalization of the living chain end. Furthermore, the clean synthesis of block copolymers by sequential monomer addition can only be accomplished with those monomers that can be efficiently initiated from the living ends. The lack of success in these areas is due to the nature of living cationic polymerization. In contrast to anionic living polymerization, in cationic living polymerizations the concentration of active species, i.e., the number of cations is extremely small with most of the chain ends being in a dormant form. For instance, in the living polymerization of isobutylene with alkyl halide/$BCl_3$ or $TiCl_4$ initiating systems, the dormant form is the chloro-terminated species (that however can be reactivated). Quenching with nucleophiles therefore will result in chloro-terminated polymers. Only a negligible portion of chain ends that are in ionic form at the introduction of the nucleophile will be functionalized.

BRIEF DESCRIPTION OF THE INVENTION

The present invention provides a process to produce capped polyolefin polymers and the products obtained. In general, the process comprises the capping or functionalizing an olefin polymer with unsubstituted or substituted diphenyl alkenes.

DESCRIPTION OF THE PREFERRED EMBODIMENTS

This invention relates in part to the discovery that 1,1-diphenylethylene can be introduced quantitatively to the living PIB chain end (1,1-diphenylethylene does not homopolymerize for thermodynamic reasons). The diphenyl polyisobutenyl cation is fully ionized because of its high stability. When quenched with methanol, the polymer carries –OMe groups exclusively. Other functionalizations by nucleophiles are also feasible. Furthermore, the clean synthesis of block copolymers can now be achieved by first transforming the polymer chain ends to diphenyl alkyl cations by diphenylethylene capping. The resulting diphenyl alkyl cation is a very efficient initiating species for the polymerization of the second monomer.

In a preferred embodiment, this invention provides a method to "cap" a living polyolefin cation, preferably a polyisoolefin cation, even more preferably a living polyisobutylene cation ($PIB^+$), with substituted or unsubstituted diphenylalkenes, preferably substituted diphenylethylenes, even more preferably unsubstituted or substituted 1,1-diphenylethylenes. Mono or multi substitution on the aromatic ring may include methyl-, methoxy-, dimethyl-, amino-, trimethylsiloxy-, groups and the like at different ring positions.

In addition, $\alpha$-methoxystyrene, trans-stilbene, 1-isopropenylnapthalene and 2,4-dimethyl-$\alpha$-methylstyrene can be used in place of the diphenyl alkene. Hereinafter and for the purposes of the claims to this invention the use of the word diphenyl alkene shall be intended to cover the use of these additional compounds.

Interestingly enough the 1,1-diphenyl alkene compounds do not homopolymerize due to steric hindrance but form stable carbocations with the living polyolefin cation.

In a preferred embodiment the living polyolefin is any polyolefin with a terminal cationic group. Typically these polyolefins are those that are made by living polymerization methods known to those of ordinary skill in the art. These living polymers make good candidates for creating living carbocationic sites on the polymer chain specifically because of their living characteristic of being able to polymerize additional monomer, i.e. react, whenever monomer is present long after the initial "polymerization" is complete. For example, polymeric carbocation can be made by reacting a living polymer with an olefin carrying sterically large groups to form a carbocation. In preferred embodiments, polyolefin, preferrably, polyisoolefin, polymultiolefin or poly(substituted or unsubstituted vinylidene aromatic compounds) more preferably polyisobutylene, is reacted with a substituted or unsubstituted diphenylalkene (the alkene may contain from 1 to 40 carbon atoms), preferrably diphenyl ethylene to create a polymer with a "cap" of the diphenyl alkene comprising a carbocation. These "capped" polyolefins with the carbocationic site may then be contacted with another monomer, preferably a styrenic monomer or vinyl ether monomer, to form a "second" polymer block attached to the first polyolefin. By this method diblock (and multiblock) copolymers can be synthesized. These block copolymers and the processes to make them are disclosed in U.S. Pat. No. 5,428,111 to Faust and Zsolt, entitled "Living Polymerization Olefins to Produce Copolymer.", U.S. Ser. No. 08/137,659, filed Oct. 15, 1993, the entire teachings of which are incorporated herein by reference.

Preferred polyolefins include $C_4$ to $C_{18}$ polyisomonoolefins, $C_4$ to $C_{14}$ polymultiolefins, and poly (substituted or unsubstituted vinylidene aromatic compounds), preferably $C_4$ to $C_{10}$ polyisomonoolefins, even more preferably $C_4$ to $C_8$ polyisomonoolefins. Polyisobutylene is an example of preferred isoolefin polymer.

One set of reaction conditions that will produce these polymeric carbocations is, in a diluent, contact the olefin monomer with an initiating system comprising an initiator (usually an organic ether, organic ester, or organic halide) and a co-initiator of Lewis acid ($TiCl_4$ is a preferred co-initiator) and a proton trap. Preferred proton traps include substituted or unsubstituted 2,6-di-tert-butylpyridines. The co-initiator is typically used in concentrations equal to or preferably 2 to 40 times higher than the concentration of the initiator. The concentration of proton trap is preferrably slightly higher than the concentration of protic impurities in the polymerization system. Polar and/or non-polar hydrocarbons and halogenated version thereof may be used as the diluent. Methyl chloride mixed with hexane is a preferred diluent composition. The polymerization is typically conducted in a temperature range of from about −10° to about −100° C., preferably from about −50° to about −90° C. for about 10 to about 120 minutes depending on the concentration of the initiator and the co-initiator. Once the desired living polymer is obtained, substituted or unsubstituted di-phenylethylene is added to the polymerization media in concentrations equal up to about 10 times the concentration of the living chain ends, preferably about 1 to about 5 times the concentration of the living chain ends, even more preferably about 1 to about 2 times the concentration of the living chain ends. The di-phenylethylene is allowed to react with the living polymer for about 10 minutes to about 5 hours, depending on the concentration of the concentration of the living chain ends and the diphenylethylene.

A preferred method for obtaining 100% capping is simply to wait. The time to wait will vary with the initiator, co-initiator and diphenylethylene concentrations. With higher initiator concentrations the time is shorter, about 20 minutes, while lower initiator concentrations may require 10 hours to achieve 100% capping.

In preferred embodiments the polymerization processes of this invention (polymerizing monomer to make living polymer) may be conducted in a polymerization zone of a conventional polymerization apparatus, in the presence or in the absence of a diluent. Suitable polymerization conditions include a temperature ranging from about minus 100° C. to about plus 10° C., preferably from about minus 80° C. to about 0° C. for a time period ranging from about 1 to about 180 minutes (hours). Preferably, the polymerization reaction mixture may be subjected to agitation using conventional mixing means.

The living polymers of the present invention may be homopolymers, copolymers, terpolymers, and the like depending upon the olefinic chargestock used.

Preferred number average molecular weights (Mn) of the living polymers of the present invention may range from about 500 to about 2,000,000, preferably from about 2,000 to about 100,000. The polymers have a narrow molecular weight distribution such that the ratio of weight average molecular weight to number average molecular weight (Mw/Mn) of the polymers ranges from about 1.0 to about 1.5, preferably from about 1.0 to about 1.2. The polymers may be recovered from the polymerization zone effluent and finished by conventional methods.

The process of the present invention may be conducted in the presence or in the absence of a diluent. Suitable diluents include $C_1$ to $C_4$ halogenated hydrocarbons, such as methyl chloride and methylene dichloride, $C_5$ to $C_8$ aliphatic hydrocarbons, such as pentane, hexane, and heptane and $C_5$ to $C_{10}$ cyclic hydrocarbons, such as cyclohexane and methyl cyclohexane, and mixtures thereof.

If solution phase is chosen, suitable diluents may be single or multi-component diluent systems that dissolve polyisobutylene. Typical diluent or solvent mixtures usually consist of a polar solvent like methyl chloride or methylene chloride and a nonpolar solvent hexane, cyclohexane or methylcyclohexane and the like. Polymerization temperatures may be from about −10 degrees C. to about −100 degrees C., preferably −50 degrees C. to −90 degrees C.

EXAMPLES

In the examples that follow, molecular weight was measured by GPC method, using polyisobutylene standards.

The proton trap was 2,6-di-tert-butyl-4-methylpryridine (4MeDTBP) or 2,6-ditert-butylpyridine.

A polyisobutylene chain was capped with 1,1-diphenylethylene (DPE), i.e.,

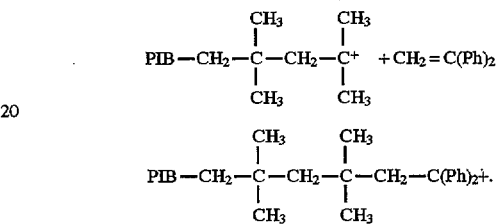

Example 1

Low molecular weight ($M_n$=2000) PIB was prepared using 2,4,4 trimethylpentyl chloride (TMPCl) as initiator and when the conversion reached 100% 1,1 diphenylethylene (DPE) was added. The reaction conditions were the following: temperature=−80° C., [TMCPl]=0.0216M, [IB]$_o$=0.77M, [proton trap]=0.004M, [$TiCl_4$]=0.0364M, solvent: methyl chloride/methylcyclohexane (MeCl/MeCH) 40/60 v/v mixture. The IB polymerization time was 10 minutes. The DPE was in 0.33M solution prepared using MeCl/MeCH 40/60 mixture and was added in 10% excess to the living end at −80° C. The proton trap was 2,6-di-tert-butyl-4-methylpryridine (4MeDTBP).

According to $^1$H NMR and GPC measurement with double detection (UV and RI) capping was essentially complete (>95%) after 20 minutes. After quenching with MeOH the polymer carried exclusively −OMe endgroups. This indicates that the diphenyl polyisobutenyl cation is fully ionized.

Example 2

Low molecular weight ($M_n$=1700) PIB was prepared using 2,4,4 trimethylpentyl chloride (TMPCl) as initiator and when the conversion reached 100% 1,1 diphenylethylene (DPE) was added. The reaction conditions were the following: temperature=−80° C.; [TMPCl]=0.02M; [IB]$_o$= 0.36M; [proton trap]=0.005M; [$TiCl_4$]=0.08M; solvent: methyl chloride/methylcyclohexane (MeCl/MeCH) 40/60 v/v mixture. The IB polymerization time was 70 minutes. The DPE was added in 5% excess to the living end at −80° C. The proton trap was 2,6-di-tert-butylpyridine (DTBP).

After 200 minutes reaction time prechilled methanol was added and the reaction mixture was poured into 10% ammonical methanol. The hexane phase was separated and the methanol was extracted twice with hexane. The combined hexane solution was washed with water until neutral and dried over anhydrous $Na_2SO_4$. The hexane was evaporated and the polymer dried in a vacuum oven for 36 hours. According to $^1$H NMR and GPC measurement with double detection (UV and RI) capping was complete. The polymer carried exclusively –OMe endgroups. This indicates that the diphenyl polyisobutenyl cation is fully ionized.

Example 3

In this example the TMPCl concentration was 0.002M. MeCl/HX 40/60 v/v solvent mixture was used. IB was polymerized with the TMPCl/TiCl$_4$ initiating system in the presence of 0.004M 2,6-di-tert-butylpyridine (DTBP) as proton trap (30 min, 100% conversion, $M_n$=2,100; $M_w/M_n$=1.20), then DPE was added. After different reaction time the reactions was quenched with MeOH, the product was washed with MeOH to remove any unreacted DPE and was dried in vacuum at ~50° C. The $M_n$ and MWD of the DPE capped samples were identical with the samples taken before the addition of DPE. The conversion calculation was based on $^1$H MNR spectra using the following peaks: in-chain CH$_3$ at 1.12 ppm (ACH$_3$), in-chain CH$_2$ at 1.42 ppm (ACH$_2$), and the aromatic peaks in the range of ~7.1 to ~7.4 ppm (A$_{ar}$). The conversion of PIBCl (Conv) was calculated in two ways:

Conv$_1$=0.6×(DP)×A$_{ar}$/ACH$_3$ and

Conv$_2$=0.2×(DP)×A$_{ar}$/ACH$_2$ where (DP) is the degree of polymerization of PIB ($M_n$/56.11). The average of the two results was used.

According to results with [TiCl$_4$]=0.0364M, MeCl/HX 40/60 v/v –80 degrees C., 100% conversion is reached in about 50 minutes when the DPE is in 8% excess and in about 20 min when the DPE is in 117% excess.

Example 4

In this example the TiCl$_4$ concentration was 0.016M during capping. MeCl/HX 40/60 v/v solvent mixture was used. IB was polymerized in a more concentrated solution ([TMPCl]=0.00345M, [TiCl$_4$]=0.02765M, [IB]$_o$=0.1232M, [DTBP]=0.00691M, 30 minutes, 100% conversion, $M_n$=2,300, $M_w/M_n$=1.27) and then the reaction mixture was diluted and DPE was added. After the DPE addition [DPE]$_o$ became 0.00206M or 0.00412M, the [TiCl$_4$] was 0.016M, and [PIBCl]$_o$ was 0.00177M. From the results 100% conversion is reached in ~250 minutes DPE is in 16% excess and in 95 minutes with 133% excess.

Example 5

The experiments were repeated using MeCl/MeCH instead of MeCl/HX. The IB polymerization time was 45 minutes. Similarly to results with the MeCl/HX solvent mixture according to the results 100% conversion is reached in about 50 minutes when the amount of DPE is close to stoichiometric.

Example 6

In this example the TiCl$_4$ concentration was 0.016M during capping. IB was polymerized in a more concentrated solution ([TMPCl]=0.00345M, [TiCl$_4$]=0.02765M, [IB]$_o$=0.1232M, [DTBP]=0.00691M, 30 minutes, 100% conversion, $M_n$=2,300, $M_w/M_n$=1.27) and then the reaction mixture was diluted with solvent and DPE was added. After the DPE addition [DPE]$_o$ became 0.00206M or 0.00412M, the [TiCl$_4$] was 0.016M, and [PIBCl]$_o$ was 0.00177M.

According to the results 100% PIBCl conversion is reached in about 32.5 h when the DPE is in 11% excess and in ~310 minutes with 123% DPE excess.

Example 7

In this example dicumyl acetate was used as initiator. MeCl/HX 40/60 v/v solvent mixture was used (PIB $M_n$=5400). The reaction conditions were the following: temperature=–80 degrees C., [TMPCl]=0.018M, [IB]$_o$=1M, [TiCl$_4$]=0.289M, solvent: methyl chloride/hexane (MeCl/HX) 40/60 v.v mixture. The IB polymerization time was 15 minutes. The DPE was added in 85% excess to the living ends at –80° C. No proton trap was used. The DPE capping was complete after 30 minutes.

As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A method of producing an endcapped polymer comprising contacting under reaction conditions a cationically polymerizable monomer with an initiator to produce a living polymer and thereafter contacting the living polymer with a cationically non-homopolymerizable ethylenically unsaturated monomer, wherein the ethylenically unsaturated non-homopolymerizable monomer is cationically co-polymerizable, to produce the endcapped polymer.

2. The method of claim 1 wherein the living polymer is a C$_4$ to C$_7$ isomonoolefin polymer.

3. The method of claim 1 wherein the living polymer is polyisobutylene.

4. The method of claim 1 wherein the cationically non-homopolymerizable monomer is a diphenylethylene.

5. The method of claim 1 wherein the cationically non-homopolymerizable monomer is 1,1-diphenylethylene.

6. The method of claim 1 wherein the cationically non-homopolymerizable monomer is 1,1-diphenylethylene and the living polymer is polyisobutylene.

7. The method of claim 1 wherein the cationically non-homopolymerizable monomer is selected from the group consisting of substituted or unsubstituted α-methoxystyrene, trans-stilbene, 1-isopropenylnapthalene and 2,4-dimethyl-α-methylstyrene.

* * * * *